United States Patent [19]

Hörner et al.

[11] 4,428,973

[45] Jan. 31, 1984

[54] METHOD FOR THE HOMOGENEOUS COMPLETE ENCAPSULATION OF INDIVIDUAL GRAINS OF POURABLE MATERIAL AND APPARATUS FOR ITS PRODUCTION

[75] Inventors: Ernst L. Hörner; Jürgen C. Knolle, both of Eschwege; Hans Grimm, Meinhard, all of Fed. Rep. of Germany

[73] Assignee: Saat- und Erntetechnik GmbH, Eschwege, Fed. Rep. of Germany

[21] Appl. No.: 207,651

[22] Filed: Nov. 17, 1980

[51] Int. Cl.³ .............................................. B32B 7/02
[52] U.S. Cl. ........................................ 427/3; 118/303; 118/19; 427/213
[58] Field of Search ...................... 118/303, 19, 24, 62; 427/213, 3; 426/302

[56] References Cited

U.S. PATENT DOCUMENTS

| | | | |
|---|---|---|---|
| 3,112,220 | 11/1963 | Heizer | 427/213 |
| 3,231,413 | 1/1960 | Berquin | 427/213 |
| 3,386,182 | 6/1960 | Lippert | 118/303 |
| 3,880,116 | 4/1975 | Paillig | 118/303 |

*Primary Examiner*—Sam Silverberg

*Attorney, Agent, or Firm*—Scully, Scott, Murphy & Presser

[57] ABSTRACT

Method for the uniform, fully enclosing surface coating of individual particles of pourable materials having nearly uniform particle size with either a smooth, rough or scabrous serrated surface, in a fluidizing fountain with heat air under use of an inorganic and or organic coating material in the form of a suspension or solution. A predetermined quantity of the material is to be coated within a steep funnel-like upwards enlarged container, having a shorter less steep funnel-like lower segment located at the bottom of the upwardly enlarged container through injection of a heat air stream at controlled velocity in ascending vertical direction, forming a fluidized fountain of limited height and diameter incident to the middle axis, thereby forming a core zone; with injection from below and in the same direction as the heat air through one or several injection nozzles, located at the lower end of the container of the suspension or solution facing in an upward direction. The steep funnel-like, upwards enlarged container has either a circular or polygonal configuration whose upper portion constitutes a body of increasing diameter. The container is equipped at the upper and lower end with screen closures consisting of exchangeable screens of maximum free area with a mesh size smaller than the smallest particle of the material to be coated.

14 Claims, 1 Drawing Figure

U.S. Patent     Jan. 31, 1984     4,428,973
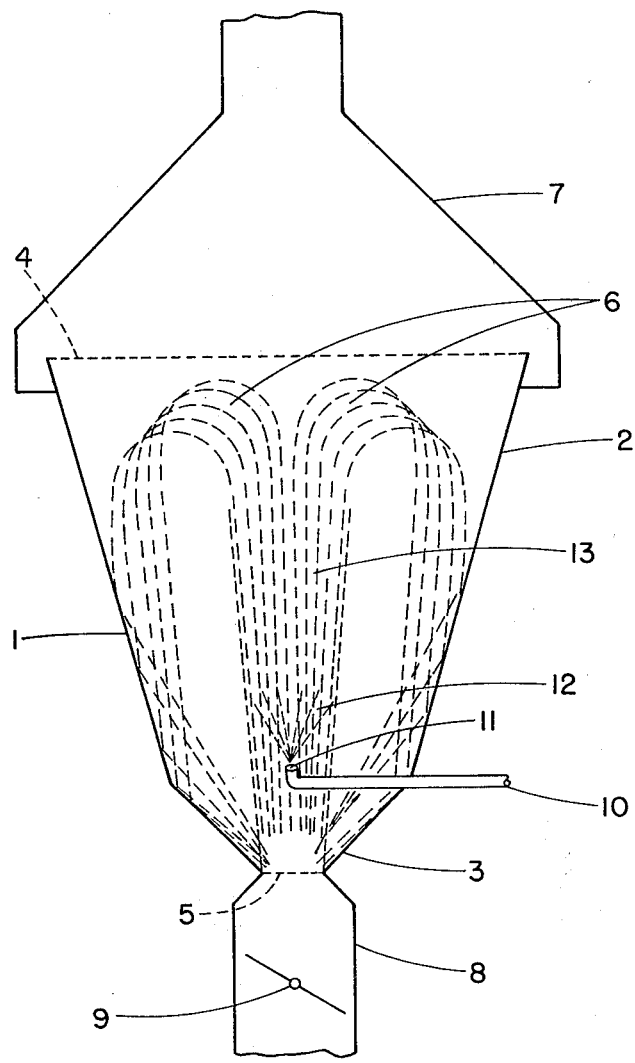

METHOD FOR THE HOMOGENEOUS COMPLETE ENCAPSULATION OF INDIVIDUAL GRAINS OF POURABLE MATERIAL AND APPARATUS FOR ITS PRODUCTION

Surface coating of granular products is an established technology. Encapsulation or coating is carried out normally in rotating containers. These have the disadvantage of considerable friction between the graines to be coated and absence of sufficient intermittent drying can lead to the formation of agglomerates and lumps.

Coating by means of a fluidizing bed is also known but this has the considerable disadvantage that a uniform fluidizing bed of constant volume concentration can be achieved only with great difficulties. The process of fluidizing bed surface coating therefore leads quite often to manufacturing difficulties.

A further disadvantage is found in the fact that a uniform disposition of the coating material is not easily achieved because the flow of the coating media is difficult to control. Furthermore, the required fast injection of air needed to dry the sprayed materials is too low so that the caking of the surface coated particle cannot be avoided. Thereby unwanted agglomerates of the coated particle are produced and not a uniformly coated product. Such fluidizing beds are furthermore not divided into zones of specific functions, as for instance into a core zone and peripheral zone thereby assuring that uniform pressure over the entire fluid bed dimension prevails.

These disadvantages prevalent in the processes of surface coating of granular materials are eliminated by the apparatus and methodology of this invention.

The fluidizing bed technique has been subject of considerable study and development efforts as demonstrated by the cited numerous patent applications.

DE-OS No. 17 92 752 details a process for the continuous production of agglomerates. By means of a fluidizing bed the material to be treated is to pass through a vapor phase of wet steam. The apparatus consists of a cylindrical pipe which carries an exit port on the lower end.

Neither the intended function nor the geometric configuration suggested the apparatus and processing method of the present invention.

The DE-OS No. 23 41 504 pertains to a method for fluid bed spray granulation. Air is to be injected through a screen bottom and the granulates formed by the injected liquid coating is to be macerated with fast rotating hammers. This apparatus too uses a cylindrical fluid bed chamber with uniform pressures. Therefore, this process has little in common with the teachings of the present invention, since it does not operate with a uniform pressure zone but comprises zones of varying flow pressures.

The DE-OS No. 23 61 998 describes a process and apparatus for the continuous production of granulates by fluid bed technique. Here the granulate formation is to take place in compartments, constituting separate cells by means of fluidization and atomization of the liquid coating media. This technology uses an entirely different approach and the suggested method does not allow surface coating without the formation of agglomerates.

The DE-OS No. 24 15 586 pertains to a process and apparatus for the sinter granulation and heat treatment of pourable materials in the fluidizing bed. The cylindrical granulator is to use a fluid bed whose screen mesh size for the formation of the fluidizing effect allows the passage of the granules. Thereby a product having a maximum size/density coefficient is to be manufactured. This process does not suggest the methodology and the equipment of the present invention in any way.

The DE-OS No. 24 18 552 pertains to the production of granules by fluid bed technique. A clear cut definition of the technical details is not provided. Forces for kernel separation are to be chosen in such a magnitude that the portion of undersized granules within the charge amounts to no more than 5 to 15%. These forces are to be directed in such a way that the particles are emitted from the fluid bed into the spray zone. The apparatus is constructed in such a way that fluidization is produced by impact agitators arranged at an angle of 30° to the axis. For flight control of the particles each impact agitator arm is equipped with a lead panel. The granulation chamber consists of a cone segment with air supply above the screened bottom. On the upper end a cylindrical dust chamber with dust filters is attached. It is said that the granulation is effected by deposition of the injected coating material above the fluidizing zone with simultaneous drying thereof.

This granulation method also does not suggest the methodology of the present invention.

This process establishes a fluidizing effect by mechanical means and the spray zone lies above the drying zone. The funnel shaped cone segment has entirely different functions serving primarily to enlarge the spray zone. This method and apparatus does not teach to construct the mechanism in such a way that a core zone and peripheral zone is established and does not suggest to work with high volume concentrations in the core zone. Neither does the injection take place with simultaneous pre-drying of the coating material. Thus the basic concept is entirely unrelated to the present invention.

The DE-OS No. 26 43 121 pertains to a fluid bed granulation process and a mechanism for its accomplishment. Alternately a spray and drying cycle is to take place. The spray cycle is timed to attain a liquid content of 50% by weight of the particles to be followed by the drying cycle in which complete drying is achieved. The apparatus is equipped with automatic control devices for the cyling sequences. Additionally, a shaker screen is installed between the respective segments. This granulation equipment has thus not suggested the workings and principles of the present invention, but is based on different concepts. A controlled surface coating by this method is not achievable since the particles begin to agglomerate already in the spray zone and are dried afterwards in that state.

More recently, the DE-OS No. 28 51 627 has suggested a method for the granulation of solid materials in powder form under use of an aqueous media system. The solid in powder form is to translocate pneumatically under simultaneous injection spraying of the aqueous coating media. It is important that these components remain in the gas-phase segment until agglomeration has taken place to be then moved from the spray injection zone. The cylindrical container carrying a conical exit mechanism does not show any significant improvement of this state of technology.

The DE-OS No. 23 17 129 pertains to a dual-phase granulator. It consists of a cylindrical container with side entrance for the air which is located at the rim of the bottom plate. The container can be lifted from the bottom part thereby creating an air inlet. Granulation takes place while the container is closed and mechanical agitation with chopping facilities is to create a mixing effect on the container bottom. Thereafter preheated air is introduced via the air inlet to dry the charge. This process and equipment arrangement operates on different principles than that of the present invention since it employs a uniform pressure zone and coating application and drying are carried out in subsequent steps.

The DE-OS No. 25 51 578 describes a granulator comprising a cylindrical container having an agitator whose function it is to keep the segment for air entrance free of the granulate. This mechanism with a fluidizing zone did not suggest the process and apparatus of this present invention.

The DE-OS No. 1 109 715 pertains to a multistage process for the production of fertilizer layer granulates. The patent teaches to form first a core of 1 to 3 millimeter diameter from powdered phosphate components by way of granulation. This core is to be further surface coated with water soluble phosphates until the outer layer makes up from 40 to 99% of total. This process is a true granulation working in two stages, for instance, first to a size of about 2 millimeters and then with the water soluble phase to a 5 millimeter particle size diameter. Both portions of the granule consist of phosphate materials. Technical details of the process are not disclosed.

The DE-OS No. 1 592 680 pertains to a process for the drying, compacting, encapsulation and cooling of fertilizers. Particles of fertilizer are to be introduced into a powder-gas mixture of powdered encapsulation material under simultaneous drying, cooling, hardening and surface coating. The equipment consists of a container which is divided into an upper a lower chamber by means of a perforated plate. Both these chambers are nearly completely filled with the material to be treated and air is being forced through the charge. Maceration of the produce is accomplished with a respective mechanism. This equipment cannot be identified as a fluid bed in which fluidization takes place in an air and liquid stream. Therefore, this equipment and process does not coincide with the teachings of the present invention.

The DE-OS No. 1 937 424 pertains to a process for the suface coating of finely divided solid particles. The solid particles are to be suspended in a turbulent atmosphere with a rotating motion along the vertical axis. A solidifying surface coating is to be applied in form of an atomized liquid phase. For the rotating motion a mechanical arrangement is used in the form of a paddle agitator, operated at 100 RPM. Uniform surface coating is to be accomplished through the rotation of the finely divided particles. Such a mechanism with a centrifugal ventilator is not needed in the process of this invention. Here the uniform coating is accomplished by establishment of a fluidizing fountain of controlled characteristics and flow velocity in the direction of the middle axis of the core zone, under maintenance of a high volume concentration. Thus the cited technology is obviously based on different concepts and did not suggest the method and equipment employed in the present invention since the latter uses other principles and equipment elements.

The DE-OS No. 27 26 164 pertains to a coating mechanism for the production of coating layers on particles. The equipment consists of a vertical hollow cylindrical body into which a hollow cone segment is mounted in an upright position. Outside the cone segment the deposition zone for the material to be treated is located. The air stream passing through the cone segment contains the atomized coating material. By means of baffels the entering air is formed into jet streams moving upwards. An air stream of generally uniform velocity is employed over the entire volume of the chamber. The material deposited outside of the cone segment is carried by the air stream. The lower portion of the cone is designated as the central or coating zone. Here the material to be treated makes contact with the atomized spray. In the upper region of the hollow cone segment the liquid phase deposited onto the particles solidifies by means of evaporation or coagulation. Agglomeration is avoided by acceleration of the flow of the particles and prevention of separation of the particles in vertical direction.

This region of the cone segment is designated as the drying zone. By means of deceleration above the core segment an expansion effect is to take place which facilitates further drying. By gravity the material falls back into the coating zone. Recycling is continued until the desired coating depth is reached. This equipment and method of surface coating are considerably different than that of the present invention, since here a cone segment positioned in a vertical container of cylindrical configuration is not employed.

The apparatus of this invention on the other hand consists in this instance of an upper part within the vertical increasing dimensions of diameter and a shorter, funnel-like lower part. The material to be coated is not located outside of the zone into which the air enters. Thus a true fluidizing effect is obtained and not a simple entrainment as is the case elsewhere. This has the great advantage that less air is needed to develop a core zone of high volume concentration for the surface coating process. Furthermore, this process of surface coating takes place in the considerably larger volume of the core zone and not in the much smaller zone volume of the cone segment.

Only the technical superiority of the method of this invention and its well designed mechanical provisions satisfy the requirement to produce a uniform, totally enclosing surface coating of individual kernels of pourable materials of nearly equal particle size having either a smooth, rough, or serrated surface in a fluidizing fountain of heated air with the use of an inorganic, and or, organic coating material in the form of either a suspension or solution. The process according to this invention is defined a method for the uniform, fully enclosing surface coating of individual particles of pourable materials having nearly uniform particle size with either a smooth, rough or scabrous serrated surface, in a fluidizing fountain with heated air under use of an inorganic and or organic coating material in the form of a suspension or solution. A predetermined quantity of the material to be coated within a steep funnel-like upwards enlarged container, having a shorter less steep funnel-like lower segment located at the bottom of said upwards enlarged container by means of injection of a heated air stream at controlled velocity in ascending vertical direction forms a fluidized fountain of limited height and diameter incident to the middle axis, thereby forming a core zone; injection is effected from below and in the same direction as the heated air by means of one or several injection nozzles, located at the lower end of the container of the suspension or solution in an upward direction with a nozzle spray angle of between 30° and 60° at a predetermined mass/time ratio into the core stream of high volume concentration and the complete, uniform deposition of the suspension on the surface of the material, and simultaneous drying of the treated material during the ascent in the core zone and its descent within the peripheral, reduced air stream pressure, sliding along the vessel wall into the funnel-shaped lower container segment towards the fluidizing fountain and the repeated cycling of this processing step until the predetermined coating quantity has been applied and the drying of the surface coated material to a prescribed moisture content. The steep funnel-like, upwards enlarged container has either a circular or polygonal configuration whose upper portion constitutes a body of increasing diameter wherein the diameter ratio of the upper part, measured from the bottom to the top is in a ratio of 1:1.5 to 1:4.5 and said shorter less steep funnel-like lower segment opens into said upper portion and has sides which form an angle relative to the perpendicular of 20° to 50°, with container being equipped at the upper and lower end with screen closures consisting of exchangeable screens of maximum free area with a mesh size smaller than the smallest particle of the material to be coated.

At the beginning of the processing a known quantity of the material to be coated is placed into the container with nonparallel walls of upwards increasing diameter which has a lower shorter more shallow, funnel-like bottom part through which an upward stream of heated air of a specific velocity is directed so as to form a fluidizing fountain with the product, identified here as the core zone. Together with the hot air and in the same ascending direction the suspension or solution is injected at a spray angle of between 30° and 60° into the fluidizing fountain until the predetermined quantity per unit time has been adsorbed in the core zone of high volume concentration. During ascend of the material in the core zone predrying is taking place, followed by the descent of the coated product in the peripheral zone of reduced pressure into the funnel-shaped bottom part for re-entry into the fluidizing fountain; this cycle is to be repeated until the prescribed coating quantity has been applied. This is followed by the drying of the material thus surface coated to a predetermined final product moisture.

The invention is further defined by the method wherein the product of uniform particle size to be coated does not fall below a diameter of 0.5 millimeter as the lower limit and not exceed 15 millimeters as the upper limit of kernel size within a processing batch. The material which is to be surface coated may consist of food stuffs, sundries and pharmacological products.

The high volume concentration derives from the relationship of the volume of the product to be coated within the core zone to that of the core zone, and ranging from 10:100 to 35:100.

The core zone of the fluidized fountain which is formed by the from below entering heated air by means of an orifice constitutes a steep inverted cone whose diameter ratio of the lower end, as formed by the orifice to that of the upper diameter is in the range of 1:1.2 to 1:2 value.

The flow velocity at the bottom of the container is regulated in such a way that the height of the core zone reaches $\frac{3}{4}$ to 4/5 of the container height. The particles of the material to be coated are within a generally homogenous charge, do not exceed the average particle size by ±20% and that the material is of about equal specific gravity.

The method further comprises creating a spray fog having a particle size which is several times smaller than the average particle size of the material to be coated by atomizing the suspension or solution with a high nozzle exit pressure. The particle size of the spray fog is controlled by the choise of nozzle configuration and the spray pressure depending upon the viscosity of the suspension or solution. The exit pressure is controlled in such a way that the expansion velocity of the spray particles is greater than the fly velocity of the coated particles, or material. The exit angle and the spreading velocity of the particles within the spray fog at nozzle exit is being limited to a maximal value so that at complete adsorption of the coating material on the surface of the material thus to be treated, a horizontal exit from the area of high volume concentration of the core zone is avoided. The height of the spray fog in the upper region of the container is being regulated by means of spray pressure and the velocity of the entering heated air and that this height is being limited to such a value that at complete adsorption on the surface of the material to be coated, the escape of free spray particles through the top of the core zone is inhibited.

The method further comprises condensing the vapor in the cooled vapor-laden air being exhausted, cleaning and reheating the air, and reusing either a portion or all of said air in the method.

The method employs a container with a known quantity of the material to be treated during continuous processing; introducing below said container heated air in unison with a partial quantity of the suspension, solution, or multi-component suspension or solution into the core zone of the material to be coated and dried simultaneously; applying an additional partial quantity of the same suspension or solution or another suspension or solution to the material; repeating the application step until a predetermined coating quantity is homogeneously deposited onto the kernels of the material; and drying the coated material until a predetermined final product moisture has been reached.

Other specific inventive features pertain to the high volume concentration resulting from the relationship of the volume of the material in process within the core zone to that of the core zone itself. Another distinctive feature is given in the formation of this core zone within the fluidizing fountain, having a funnel-shaped configuration with upward increasing diameter of singular ratio relative to the lower and upper dimensions in addition to the control of the air velocity at the bottom of the container for the adjustment of the height of the core zone.

Other distinctive features pertain to the nature of the materials to be treated. Preferably the particle size should not vary by more than ±20% from the average and should be of about equal specific gravity.

Other process definitions pertain to a fine spray mist having particles which are several times smaller than the average particle size of the material to be treated. The particle size of the atomized spray is controlled by the selection of nozzle configuration and the spray pressure, depending upon the viscosity of the suspension or solution, whereby the exit pressure is adjusted so that the expansion velocity of the liquid particles is greater than the flight velocity of the material in process. Furthermore, the exit angle and expansion velocity of the spray particles at nozzle exit is limited to a maximal value so that at complete adsorption of the coating material a vertical escape from the core zone is avoided.

These process definitions pertain also to the control of the height of the spray fog in the upper part of the container by means of fluid pressure and velocity of the hot air so that escape of free spray particles is inhibited. Additional process features pertain to the cleaning, drying and recycling of the exhaust air.

A preferred method of the process of the invention consists of filling one container periodically in a continuous process with a known quantity of the material to be treated and injecting from below of hot air in unison with a partial quantity of the suspension, or solution into the core zone, thus to be surface coated and at the same time partially dried. Thereafter an additional portion of the suspension or solution is introduced and predried in much the same fashion and this step is repeated until the predetermined coating quantity has been homogeneously deposited onto the particles of the material; followed by drying to a known final moisture content.

Other specific process features pertain to the equipment arrangement for the process of this invention. These entail marked construction characteristics of equipment segments such as the upwardly expanding container and its funnel-like lower part and having a screen closure at its upper and lower end of specific diameter ratio. The sieves being exchangeable and having a pertinent mesh size and free area. The apparatus for the performance of the process of the invention is equipped with an exhaust hood positioned above the upper screen closure. The apparatus is furthermore furnished with an air flow regulator positioned at the lower screen closure and which consists of a channel with pertinent dimensions for the hot air inlet which by means of a baffel is made adjustable.

Further specific inventive equipment features for the performance of the process of this invention pertain to the arrangement of spray nozzles in the lower portion of the container as well as the surface coating of the inner wall of the container for improved slideability of the product in process in conjunction with noise reduction functions of this surface coating which consists of a rub resistant, smooth surfaced plastic.

The process according to the present invention and its equipment for its performance is described in the example. The process of this invention is however not limited to the given example; this also holds true for the arrangement of pertinent associated mechanisms which under application of their technical effects could be employed in a modified arrangement.

EXAMPLE

The container (1) is filled from above with 5 kg. of a material in pellet form having a specific gravity of 0.9 to 1.1 kg/liter with a particle size range of 3.0–4.75 millimeter. After closing the upper screen cover (4) an air stream of 40° to 100° C. is introduced from below through the container which by means of a baffel (9) in the air shaft (8) is controlled in such a way that the material lying in the funnel-shaped lower part (3) of the container (1) are fluidized to form within the centrally located core zone (13) an ascending fluidizing fountain (16). The construction of the air entry port with diameter and form of the airshaft (8) in conjunction with the diameter of the lower screen closure (5) under consideration of its open area and the diameter and form of the lower funnel (4) of the container, causes the air stream to form with the material a bundled core zone (1) of rotating, swirling kernels. From height and form of the core zone, appearing as a slender funnel of 15 millimeter middle diameter and a height of 0.7 to 0.8 meters and the volume of the charged quantity of the pellets, an average volume concentration of the pellets within the core zone of about 20 to 25% can be calculated. The flow velocity and the flow pressure decrease with increasing height of the core zone, because of the diameter enlargement of the stream and the pressure loss due to the flow resistance of the kernels. The counter-acting gravitational force of the kernels slows their velocity to the equilibrium of the flow velocity and speed of fall so that the pellets in a return zone above the core zone (13) move outwards into the region of reduced flow pressure and velocity. Sliding along the container wall back into the lower part of the container (3) they are uniformly and continuously returned into the flow center of the fountain and fluidized again. Material weight and inclination of the lower funnel (3) which is greater than the pour angle of the kernel pile at rest, facilitates the continuous re-entry.

By means of a blower having a capacity of 500 to 2000 Pa water column absolute pressure and the air velocity in the air shaft with assumed unhindered flow in the range of 6 to 15 meters/second the entering air is controlled in such a way that the core zone (13) and the return zone of the fluidizing fountain (6) does not exceed ¾ to 4/5 of the height of the container.

The prepared solution or suspension for the surface coating of the material at a concentration of 20 to 30% solids and a viscosity of 0.5 to 1.0 Pa s is pumped into the spray nozzle assembly (10) under application of 50 to 200 bar pressure depending upon the required spray pattern. One or several spray nozzles, located in the lower part of the funnel (13) of the container (1) are used to spray the solution in unison with the entering hot air into the core zone with a spray pattern angle of 60° and a particle size of less than 0.2 millimeter in diameter.

The spray pattern angle is reduced by the effect of the flow velocity of the heated air and increasing distance from nozzle exit. Through selection of the spray nozzle configuration and pump pressure its size is limited in such a way that the deflection of the spray particle through the hot air in axial direction and increasing adsorption of the particles on the surface of the kernels through their high volume concentration, and their relation to the spreading velocity/slower ascend rate in the core zone (13) of the fluidizing fountain (6) causes the spray zone (12) to be limited in volume and height in such a way that the spraying of the container wall and the upper screen closure is cautiously avoided.

As soon as the operating conditions for the heated air flow for the adjustment of the fluidizing fountain are established and selection of the nozzle configuration or types and their position as well as the spray particle size and pattern according to the process condition is accomplished, the calibration of the spray volume can take place. Under the condition that the surface coating ought to amount to a weight increase of 10% and that the suspension or solution has a solids content of 20% by weight, it is required to apply 2.5 kg of the suspension or solution to 5 kg of the material. This is accomplished in a defined, short time span by the calibrated spray nozzle assembly under application of the pre-set spray liquid pressure.

The coating process is then divided on a time basis into a spray and drying phase so that the predrying coincides with the spray phase. At the end of the spray and pre-dry cycles a pure drying phase follows. Its duration depends on the temperature of the hot air and encompasses a short, defined time span which is limited by the fact that the exhaust air temperature does not increase to a considerable degree as long as the energy of the hot air is used only for the evaporation of the water of the suspension or solution with which the material has been coated. The kernels attain a specific temperature according to vapor pressure and prevailing atmospheric conditions and thus the exhaust air temperature remains constant. Only after drying the surface and reduced diffusion of the liquid from the kernels into the vapor phase by virtue of increased diffusion resistance of the dried layer, this layer becomes increasingly warmer towards the center of the particle. A measure for the rise of the product temperature is therefore given in the rise of the exhaust air, according to which the temperature of the process air may be adjusted downward either stepwise or in one sweep to the given end temperature of the material. Or else, the product may be removed as soon as a predetermined exhaust temperature has been reached to be cooled in a suitable apparatus with cold air to a preset temperature. Through sampling during the drying phase its duration is determined according to which the product may not exceed a temperature of for instance 40° C. and a residual moisture content of 12 to 13%. As soon as the parameters for the drying cycle are established any number of charges of the identical material may be treated under controlled process conditions within the respective time cycles.

The uniformity of surface coating of the individual pellets can be determined by optical means through the addition of a dye to the coating material. The homogeneity and complete deposition of the coating quantity from pellet to pellet can be measured by means of a tagging substance added to the coating solution with following chemical identification on the individual kernels. However, the term homogeneity denotes not only the coating with a material of identical chemical composition. The process of this invention allows application of several, chemically different layers in subsequent steps so as to form a uniform surface coating.

The given example is not limited to specific materials as long as they satisfy the given process parameters. Thus grainy natural products as well as inorganic, technically granulated materials with either a smooth, rough or serrated surface can be coated to display a uniform, fully enclosing encapsulation.

In addition to the broad application range the process of this invention provides the technical advantage to attain a uniform surface coating of great distribution exactness of a prescribed quantity or coating depth of the material to be thus applied. The process of this invention provides further for the application of common coating substances whether organic or inorganic in nature either as a solution or suspension.

The process of this invention also purveys the advantage to apply the suspension or solution practically completely free of loss due to the function of high volume concentration (V/V). Thus the refurbishing, recycling or loss of the material is eliminated.

Simultaneously, non-contaminated exhaust air is advantageously provided for. The process of this present invention and its equipment arrangement provides also the technical advantage to accomplish the surface coating within a short time frame resulting in a high throughput rate. Furthermore, damaging heating of the material is avoided which is especially important in the processing of biological materials.

Because of the short residence time within the internal flow of the process during sequential surface coating steps, the material has to travel only short, free distances resulting in a minimal friction between the coated particles with concurrent insignificant mechanical stress.

Consequently, none or in isolated cases, an insignificant degree of attrition is observed.

The geometric configuration and measurements of the apparatus according to this invention in conjunction with the versatility of operational conditions provides for the technical advantage to surface coat various material in such a way that the applied quantity, coating depth or the diameter of the particles confirm to predetermined values.

The apparatus according to this invention works also very economically and efficiently with regard to air and energy consumption.

What is claimed is:

1. Method for the uniform, fully enclosing surface coating of individual particles of pourable materials having nearly uniform particle size with either a smooth, rough or scabrous serrated surface, in a fluidizing fountain with heated air under use of an inorganic and or organic coating material in the form of a suspension or solution, characterized in that a predetermined quantity of the material to be coated within a steep funnel-like upwards enlarged container, having a shorter less steep funnel-like lower segment located at the bottom of said upwards enlarged container by means of injection of a heated air stream at controlled velocity in ascending vertical direction is forming a fluidized fountain of limited height and diameter incident to the middle axis, thereby forming a core zone; injection from below and in the same direction as the heated air by means of one or several injection nozzles, located at the lower end of the container of the suspension or solution in an upward direction with a nozzle spray angle of between 30° and 60° at a predetermined mass/time ratio into the core stream of high volume concentration and the complete, uniform deposition of the suspension on the surface of the material, and simultaneous drying of the treated material during the ascent in the core zone and its descent within the peripheral, reduced air stream pressure, sliding along the vessel wall into the funnel-shaped lower container segment towards the fluidizing fountain and the repeated cycling of this processing step until the predetermined coating quantity has been applied and the drying of the surface coated material to a prescribed moisture content, wherein said steep funnel-like, upwards enlarged container has either a circular or polygonal configuration whose upper portion constitutes a body of increasing diameter wherein the diameter ratio of the upper part, measured from the bottom to the top is in a ratio of 1:1.5 to 1:4.5 and said shorter less steep funnel-like lower segment opens into said upper portion and has sides which form an angle relative to the perpendicular of 20° to 50°, said container equipped at the upper and lower end with screen closures consisting of exchangeable screens of maximum free area with a mesh size smaller than the smallest particle of the material to be coated.

2. Method according to claim 1 characterized in that the product of uniform particle size to be coated does not fall below a diameter of 0.5 millimeter as the lower limit and not exceed 15 millimeters as the upper limit of kernel size within a processing batch.

3. Method according to claim 1 or 2, characterized in that the material to be surface coated may consist of food stuffs, sundries and pharmacological products.

4. Method according to claims 1 or 2, characterized in that the high volume concentration derives from the relationship of the volume of the product to be coated within the core zone to that of the core zone, and ranging from 10:100 to 35:100.

5. Method according to claims 1 or 2, characterized in that the core zone of the fluidized fountain which is formed by the from below entering heated air by means of an orifice constitutes a steep inverted cone whose diameter ratio of the lower end, as formed by the orifice to that of the upper diameter is in the range of 1:1.2 to 1:2 value.

6. Method according to claim 1, which further comprises regulating the flow viscosity at the bottom of the container in such a way that the height of the core zone reaches ⅔ to 4/5 of the container height.

7. Method according to claim 1, characterized in that the particles of the material to be coated are within a generally homogenous charge, do not exceed the average particle size by ±20% and that the material is of about equal specific gravity.

8. Method according to claim 1, which further comprises creating a spray fog having a particle size which is several times smaller than the average particle size of the material to be coated by atomizing the suspension or solution with a high nozzle exit pressure.

9. Method according to claim 8, characterized in that the particle size of the spray fog is controlled by the choice of nozzle configuration and the spray pressure depending upon the viscosity of the suspension or solution.

10. Method according to claim 8, characterized in that the exit pressure is controlled in such a way that the expansion velocity of the spray particles is greater than the fly velocity of the coated particles, or material.

11. Method according to claim 8, characterized in that the exit angle and the spreading velocity of the particles within the spray fog at nozzle exit is being limited to a maximal value so that at complete adsorption of the coating material on the surface of the material thus to be treated, a horizontal exit from the area of high volume concentration of the core zone is avoided.

12. Method according to claim 8, characterized in that the height of the spray fog in the upper region of the container is being regulated by means of spray pressure and the velocity of the entering heated air and that this height is being limited to such a value that at complete adsorption on the surface of the material to be coated, the escape of free spray particles through the top of the core zone is inhibited.

13. Method according to claim 1 which further comprises condensing the vapor in the cooled vapor-laden air being exhausted, cleaning and reheating the air, and reusing either a portion or all of said air in the method.

14. Method according to claim 1, which further comprises filling a container with a known quantity of the material to be treated during continuous processing; introducing below said container heated air in unison with a partial quantity of the suspension, solution, or multi-component suspension or solution into the core zone of the material to be coated and dried simultaneously; applying an additional partial quantity of the same suspension or solution or another suspension or solution to the material; repeating the application step until a predetermined coating quantity is homogeneously deposited onto the kernels of the material; and drying the coated material until a predetermined final product moisture has been reached.

* * * * *

UNITED STATES PATENT AND TRADEMARK OFFICE
CERTIFICATE OF CORRECTION

PATENT NO. : 4,428,973
DATED : Jan. 31, 1984
INVENTOR(S) : Ernst L. Horner, et al.

It is certified that error appears in the above-identified patent and that said Letters Patent are hereby corrected as shown below:

Column 3, line 39: "produce" should be --product--;

Column 3, line 45: "suface" should be --surface--;

Column 11, line 20: "viscosity" should be --velocity--.

Signed and Sealed this

Thirtieth Day of October 1984

[SEAL]

Attest:

GERALD J. MOSSINGHOFF

Attesting Officer

Commissioner of Patents and Trademarks